(12) United States Patent
Zhang et al.

(10) Patent No.: US 10,972,245 B2
(45) Date of Patent: Apr. 6, 2021

(54) METHOD AND DEVICE FOR TRANSMITTING MEASUREMENT PILOT SIGNAL

(71) Applicant: HUAWEI TECHNOLOGIES CO., LTD., Shenzhen (CN)

(72) Inventors: Leiming Zhang, Beijing (CN); Yifan Liu, Shenzhen (CN); Ming Lei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/453,562

(22) Filed: Jun. 26, 2019

(65) Prior Publication Data

US 2019/0319763 A1    Oct. 17, 2019

Related U.S. Application Data

(63) Continuation of application No. PCT/CN2017/118366, filed on Dec. 25, 2017.

(30) Foreign Application Priority Data

Dec. 28, 2016 (CN) .......................... 201611239759.0

(51) Int. Cl.
*H04W 72/04* (2009.01)
*H04L 5/00* (2006.01)

(52) U.S. Cl.
CPC .......... *H04L 5/0051* (2013.01); *H04L 5/0005* (2013.01); *H04L 5/0094* (2013.01); *H04W 72/042* (2013.01)

(58) Field of Classification Search
CPC ....... H04L 5/00; H04L 5/0051; H04L 5/0094; H04L 5/0005; H04W 72/04; H04W 72/042
See application file for complete search history.

(56) References Cited

U.S. PATENT DOCUMENTS 9,338,786 B2 * 5/2016 Nishikawa ............ H04L 5/0048
2005/0215251 A1   9/2005 Krishnan et al.
(Continued)

FOREIGN PATENT DOCUMENTS

CN         101064701 A      10/2007
CN         101394199 A       3/2009
(Continued)

OTHER PUBLICATIONS

"Considerations on reference signal design for NR," 3GPP TSG-RAN WG1 Meeting #86, Gothenburg, Sweden, R1-167573, XP051140727, pp. 1-5, 3rd Generation Partnership Project, Valbonne, France (Aug. 22-26, 2016).

(Continued)

*Primary Examiner* — Chi Ho A Lee
(74) *Attorney, Agent, or Firm* — Leydig, Voit & Mayer, Ltd.

(57) ABSTRACT

A method for measurement pilot signal is provided. The method includes: determining, by a first device from a plurality of subbands included in system bandwidth, a first subband that is used to transmit a measurement pilot signal, where one subband includes at least one physical resource block; sending, by the first device, identifier information of the first subband to a second device; and transmitting the measurement pilot signal in at least one physical resource block corresponding to the first subband to the second device.

12 Claims, 6 Drawing Sheets

(56) References Cited

U.S. PATENT DOCUMENTS

| | | | |
|---|---|---|---|
| 2005/0282568 A1* | 12/2005 | Keerthi | H04L 7/041 |
| | | | 455/502 |
| 2009/0122884 A1* | 5/2009 | Vook | H04B 7/0689 |
| | | | 375/260 |
| 2009/0232073 A1 | 9/2009 | Yan et al. | |
| 2010/0027486 A1* | 2/2010 | Gorokhov | H04B 1/7075 |
| | | | 370/329 |
| 2015/0009939 A1* | 1/2015 | Zhang | H04W 72/1289 |
| | | | 370/329 |
| 2015/0139105 A1* | 5/2015 | Guo | H04W 72/04 |
| | | | 370/329 |
| 2015/0172024 A1* | 6/2015 | Kim | H04B 7/024 |
| | | | 370/329 |
| 2015/0326335 A1* | 11/2015 | Chen | H04J 11/0079 |
| | | | 370/252 |
| 2015/0373571 A1* | 12/2015 | Chincholi | H04L 5/0057 |
| | | | 370/330 |
| 2016/0029238 A1 | 1/2016 | Chen et al. | |
| 2016/0048406 A1 | 2/2016 | Cucinotta | |
| 2016/0112177 A1* | 4/2016 | Zheng | H04W 72/082 |
| | | | 370/330 |
| 2017/0264412 A1 | 9/2017 | Chen et al. | |
| 2017/0310384 A1* | 10/2017 | Park | H04L 1/0026 |
| 2017/0317731 A1 | 11/2017 | Chen et al. | |
| 2018/0063818 A1* | 3/2018 | Chen | H04W 72/042 |
| 2020/0022148 A1* | 1/2020 | Tang | H04W 72/0453 |

FOREIGN PATENT DOCUMENTS

| | | |
|---|---|---|
| CN | 101515821 A | 8/2009 |
| CN | 101841817 A | 9/2010 |
| CN | 102056302 A | 5/2011 |
| CN | 103813468 A | 5/2014 |
| CN | 104038312 A | 9/2014 |
| CN | 104168610 A | 11/2014 |
| CN | 105450272 A | 3/2016 |
| CN | 105490787 A | 4/2016 |
| EP | 2432182 A1 | 3/2012 |
| JP | 2008288736 A | 11/2008 |
| JP | 2012527136 A | 11/2012 |
| JP | 2018532298 A | 11/2018 |
| WO | 2016164739 A1 | 10/2016 |
| WO | 2017035238 A2 | 3/2017 |

OTHER PUBLICATIONS

"Frequency granularity of NR CSI components," 3GPP TSG RAN WG1 Meeting #87, Reno, USA, R1-1611825, total 4, 3rd Generation Partnership Project, Valbonne, France (Nov. 14-18, 2016).

"Flexible CSI-RS configuration for CSI measurement," 3GPP TSG-RAN WG1#86bis, Lisbon, Portugal, R1-1610270, total 4 pages, 3rd Generation Partnership Project, Valbonne, France (Oct. 10-14, 2016).

"Cell association for FD-MIMO evaluation," 3GPP TSG RAN WG1 Meeting #78bis, Ljubljana, Slovenia, R1-144228, total 3 pages, 3rd Generation Partnership Project, Valbonne, France (Oct. 6-10, 2014).

JP/2019-535747, Office Action, dated Oct. 26, 2020.

Samsung, "PRB bundling for Rel-10," 3GPP TSG RAN WG1 Meeting #61, Montreal, Canada, R1-103016, total 6 pages, 3rd Generation Partnership Project, Valbonne, France (May 10-14, 2010).

"3rd Generation Partnership Project; Technical Specification Group Radio Access Network; Evolved Universal Terrestrial Radio Access (E-UTRA); Physical layer procedures (Release 14)," 3GPP TS 36.213 V14.0.0, total 406 pages, 3rd Generation Partnership Project, Valbonne, France (Sep. 2016).

\* cited by examiner

METHOD AND DEVICE FOR TRANSMITTING MEASUREMENT PILOT SIGNAL

CROSS-REFERENCE TO RELATED APPLICATIONS

This application is a continuation of International Application No. PCT/CN2017/118366, filed on Dec. 25, 2017, which claims priority to Chinese Patent Application No. 201611239759.0, filed on Dec. 28, 2016. The disclosures of the aforementioned applications are hereby incorporated by reference in their entireties.

TECHNICAL FIELD

Embodiments of this application relate to the field of mobile communications technologies, and in particular, to a method and a device for transmitting a measurement pilot signal.

BACKGROUND

In an Long Term Evolution (LTE) system, a base station normally sends a downlink measurement pilot signal for estimation of state information of a downlink channel; and after receiving the downlink measurement pilot signal, user equipment (UE) performs detection and channel estimation to obtain related information of its downlink channel, for example, information such as a Pre-coding Matrix Indicator (PMI), a Channel Quality Indicator (CQI), and a Rank Indicator (RI) of the downlink channel, and finally returns the related information of the downlink channel to the base station side, so that the base station performs resource scheduling for the UE.

It can be learned from the foregoing analysis that the purpose of sending the downlink measurement pilot signal by the base station is to perform resource scheduling for the UE. In addition, in the existing LTE system, because all system bandwidth of the downlink channel is used to transmit user data, the downlink measurement pilot signal needs to be transmitted on full bandwidth. In an LTE system, system bandwidth of the LTE system occupies a plurality of physical resource block (PRBs). Therefore, in the prior art, a downlink measurement pilot signal needs to be embedded in each PRB on the LTE system bandwidth. For example, if the system bandwidth of the current LTE system is 10 M and occupies 50 PRBs, according to the prior art, the downlink measurement pilot signal needs to be embedded in every one of the 50 PRBs.

However, system bandwidth grows continuously in future 5G communications systems, and therefore there will be a requirement for transmitting user data using a part of the system bandwidth. In this case, a downlink measurement pilot signal is transmitted using some PRBs of the entire system bandwidth. Currently, there is no effective solution for transmitting a downlink measurement pilot signal.

SUMMARY

Embodiments of this application provide a method and a device for transmitting a measurement pilot signal, to transmit a measurement pilot signal on some physical resource blocks of entire system bandwidth.

According to a first aspect, an embodiment of this application provides a method for transmitting a measurement pilot signal, including: determining, by a first device from a plurality of subbands included in system bandwidth, a first subband that is used to transmit a measurement pilot signal, where one subband includes at least one physical resource block; sending, by the first device, identifier information of the first subband to a second device; and embedding, by the first device, the measurement pilot signal in a physical resource block corresponding to the first subband, and the measurement pilot signal to the second device.

In this embodiment of this application, first, the first device divides the system bandwidth into different subbands, and each subband occupies at least one PRB. Then, from the system, the first device determines the first subband that is used to transmit the measurement pilot signal, and sends the identifier information of the first subband to the second device. Finally, the first device embeds the measurement pilot signal in the PRB corresponding to the first subband, and transmits the PRB embedded with the measurement pilot signal to the second device. Correspondingly, the second device may demodulate the measurement pilot signal from a plurality of received PRBs based on the identifier of the first subband. It can be learned that, with the method disclosed in this embodiment of this application, a measurement pilot signal can be transmitted on partial bandwidth.

With reference to the first aspect, in a first possible implementation, the system bandwidth includes N subbands, the identifier information of the first subband includes N bits of data, and an arrangement order of the N bits of data is corresponding to an arrangement order of the N subbands, where a data bit corresponding to the first subband is set to a first identifier, and a data bit corresponding to each subband in the N subbands except the first subband is set to a second identifier, where the first identifier represents a subband that is used to transmit the measurement pilot signal, the second identifier represents a subband that is not used to transmit the measurement pilot signal, and N is a natural number; or before the sending, by the first device, identifier information of the first subband to a second device, the method further includes: splitting, by the first device, the plurality of subbands included in the system bandwidth into a plurality of subband sets, where one subband set includes at least one subband, and the identifier information of the first subband includes an identifier of a subband set to which the first subband belongs and a sub-identifier of the first subband in the subband set; or when the first device transmits the measurement pilot signal using a plurality of consecutive subbands, the identifier information of the first subband is generated based on an identifier of a start subband in the plurality of consecutive subbands and a quantity of the consecutive subbands; or the system bandwidth includes N subbands, the first subband is the $M^{th}$ subband in the N subbands, and the identifier information of the first subband is a binary number corresponding to M.

In this embodiment of this application, a user may select, as required, any one of the foregoing manners to determine the identifier of the first subband, so that the first subband can be flexibly identified.

With reference to the first aspect or the first possible implementation of the first aspect, in a second possible implementation, the first device is a base station, the second device is user equipment, and the measurement pilot signal is a downlink measurement pilot signal; or the first device is user equipment, the second device is a base station, and the measurement pilot signal is an uplink measurement pilot signal.

The transmission method provided in this embodiment of this application can not only be used for transmitting a downlink measurement pilot signal, but also be used for transmitting an uplink measurement pilot signal.

According to a second aspect, a method for transmitting a measurement pilot signal is provided, including: receiving, by a second device, identifier information of a first subband sent by a first device, where the first subband includes a plurality of physical resource blocks, and each physical resource block is used to transmit a measurement pilot signal; determining, by the second device based on the identifier information of the first subband, a physical resource block that is used to transmit the measurement pilot signal; and receiving, by the second device on the determined physical resource block, a measurement pilot signal sent by the first device.

In this embodiment of this application, first, the first device divides the system bandwidth into different subbands, and each subband occupies at least one PRB. Then, from the system, the first device determines the first subband that is used to transmit the measurement pilot signal, and sends the identifier information of the first subband to the second device. Finally, the first device embeds the measurement pilot signal in the PRB corresponding to the first subband, and transmits the PRB embedded with the measurement pilot signal to the second device. Correspondingly, the second device may demodulate the measurement pilot signal from a plurality of received PRBs based on the identifier of the first subband. It can be learned that, with the method disclosed in this embodiment of this application, a measurement pilot signal can be transmitted on partial bandwidth.

With reference to the second aspect, in a first possible implementation, the system bandwidth includes N subbands, the identifier information of the first subband includes N bits of data, and an arrangement order of the N bits of data is corresponding to an arrangement order of the N subbands, where a data bit corresponding to the first subband is set to a first identifier, and a data bit corresponding to each subband in the N subbands except the first subband is set to a second identifier, where the first identifier represents a subband that is used to transmit the measurement pilot signal, the second identifier represents a subband that is not used to transmit the measurement pilot signal, and N is a natural number; or the identifier information of the first subband includes an identifier of a subband set to which the first subband belongs and a sub-identifier of the first subband in the subband set, and the subband set includes at least the first subband; or when the measurement pilot signal is transmitted on a plurality of consecutive subbands, the identifier information of the first subband is generated based on an identifier of a start subband in the plurality of consecutive subbands and a quantity of the consecutive subbands; or the system bandwidth includes N subbands, the first subband is the $M^{th}$ subband in the N subbands, and the identifier information of the first subband is a binary number corresponding to M.

In this embodiment of this application, a user may select, as required, any one of the foregoing manners to determine the identifier of the first subband, so that the first subband can be flexibly identified.

With reference to the second aspect or the first possible implementation of the second aspect, in a second possible implementation, the first device is a base station, the second device is user equipment, and the measurement pilot signal is a downlink measurement pilot signal; or the first device is user equipment, the second device is a base station, and the measurement pilot signal is an uplink measurement pilot signal.

The transmission method provided in this embodiment of this application can not only be used for transmitting a downlink measurement pilot signal, but also be used for transmitting an uplink measurement pilot signal.

According to a third aspect, a method for transmitting a measurement pilot signal is provided, including: determining, by a first device from a plurality of subbands included in system bandwidth, a first subband area that is used to transmit a measurement pilot signal, where one subband includes at least one physical resource block, and the first subband area includes at least one subband; and sending, by the first device, identifier information of the first subband area to a second device; and embedding, by the first device, the measurement pilot signal in at least one physical resource block corresponding to the first subband area, and sending the measurement pilot signal to the second device.

In this embodiment of this application, first, the first device divides the system bandwidth into different subbands, and each subband occupies at least one PRB. Then, from the system, the first device determines the first subband that is used to transmit the measurement pilot signal, and sends the identifier information of the first subband to the second device. Finally, the first device embeds the measurement pilot signal in the PRB corresponding to the first subband, and transmits the PRB embedded with the measurement pilot signal to the second device. Correspondingly, the second device may demodulate the measurement pilot signal from a plurality of received PRBs based on the identifier of the first subband. It can be learned that, with the method disclosed in this embodiment of this application, a measurement pilot signal can be transmitted on partial bandwidth.

With reference to the third aspect, in a first possible implementation, the embedding, by the first device, the measurement pilot signal in at least one physical resource block corresponding to the first subband area, and sending the measurement pilot signal to the second device includes: embedding, by the first device according to a preset rule, the measurement pilot signal in the at least one physical resource block corresponding to the first subband area, and sending the measurement pilot signal to the second device.

With the method provided in this embodiment of this application, signaling needs to be sent only once, and therefore signaling overheads are reduced.

With reference to the third aspect, in a second possible implementation, the embedding, by the first device, the measurement pilot signal in at least one physical resource block corresponding to the first subband area, and sending the measurement pilot signal to the second device includes: determining, by the first device from the first subband area, a second subband that is used to transmit the measurement pilot signal; sending, by the first device, a sub-identifier of the second subband in the first subband area to the second device; and embedding, by the first device, the measurement pilot signal in the second subband, and sending the second subband embedded with the measurement pilot signal to the second device.

Signaling overheads can also be reduced using the method provided in this embodiment of this application.

With reference to the third aspect, the first possible implementation of the third aspect, or the second possible implementation of the third aspect, in a third possible implementation, the system bandwidth includes X subband areas, the identifier information of the first subband area includes X bits of data, and an arrangement order of the X bits of data is corresponding to an arrangement order of the X subband areas, where a data bit corresponding to the first subband area is set to a first identifier, and a data bit corresponding to each subband area in the X subband areas except the first subband area is set to a second identifier, where the first identifier represents a subband area that is used to transmit the measurement pilot signal, the second identifier represents a subband area that is not used to transmit the measurement pilot signal, and X is a natural number; or before the sending, by the first device, identifier information of the first subband area to a second device, the method further includes: splitting, by the first device, a plurality of subband areas included in the system bandwidth into a plurality of subband area sets, where one subband area set includes at least one subband area, and the identifier information of the first subband area includes an identifier of a subband area set to which the first subband area belongs and a sub-identifier of the first subband area in the subband area set; or when the first device transmits the measurement pilot signal using a plurality of consecutive subband areas, the identifier information of the first subband area is generated based on an identifier of a start subband area in the plurality of consecutive subband areas and a quantity of the consecutive subband areas; or the system bandwidth includes X subband areas, the first subband area is the $Y^{th}$ subband area in the X subband areas, and the identifier information of the first subband area is a binary number corresponding to Y, where Y is a natural number.

With reference to the second possible implementation of the third aspect, in a fourth possible implementation, the first subband area includes W subbands, the sub-identifier information of the second subband in the first subband area includes W bits of data, and an arrangement order of the W bits of data is corresponding to an arrangement order of the W subbands, where a data bit corresponding to the second subband is set to a first identifier, and a data bit corresponding to each subband in the W subbands except the second subband is set to a second identifier, where the first identifier represents a subband that is used to transmit the measurement pilot signal, the second identifier represents a subband that is not used to transmit the measurement pilot signal, and W is a natural number; or when the first device transmits the measurement pilot signal using a plurality of consecutive second subbands, the sub-identifier information of the second subband in the first subband area is generated based on an identifier of a start subband in the plurality of consecutive subband areas and a quantity of the consecutive subband areas; or the first subband area includes W subbands, the second subband is the $P^{th}$ subband in the W subbands, and the sub-identifier information of the second subband in the first subband area is a binary number corresponding to P, where P is a natural number; or before the sending, by the first device, a sub-identifier of the second subband in the first subband area to the second device, the method further includes: splitting, by the first device, a plurality of subbands included in the first subband area into a plurality of subband sets, where one subband set includes at least one subband, and the sub-identifier information of the second subband in the first subband area includes an identifier of a subband set to which the second subband belongs and a sub-identifier of the second subband in the subband set.

With reference to the third aspect, the first possible implementation of the third aspect, the second possible implementation of the third aspect, the third possible implementation of the third aspect, or the fourth possible implementation of the third aspect, in a fifth possible implementation, the first device is a base station, the second device is user equipment, and the measurement pilot signal is a downlink measurement pilot signal; or the first device is user equipment, the second device is a base station, and the measurement pilot signal is an uplink measurement pilot signal.

According to a fourth aspect, an embodiment of this application provides a method for transmitting a measurement pilot signal, including: receiving, by a second device, identifier information of a first subband area sent by a first device, where the first subband area includes at least one subband, and one subband includes at least one physical resource block; determining, by the second device based on the identifier information of the first subband area, a physical resource block that is used to transmit a measurement pilot signal; and receiving, by the second device on the determined physical resource block, a measurement pilot signal sent by the first device.

With reference to the fourth aspect, in a first possible implementation of the fourth aspect, the determining, by the second device based on the identifier information of the first subband area, a physical resource block that is used to transmit the measurement pilot signal includes: determining, by the second device based on the identifier information of the first subband area and according to a preset rule, the physical resource block that is used to transmit the measurement pilot signal.

With reference to the fourth aspect, in a second possible implementation of the fourth aspect, the second device receives sub-identifier information, sent by the first device, of a second subband in the first subband area, where the second subband is used to transmit the measurement pilot signal; and the second device determines, based on the identifier of the first subband area and the sub-identifier of the second subband, the physical resource block that is used to transmit the measurement pilot signal.

With reference to the fourth aspect, the first possible implementation of the fourth aspect, or the second possible implementation of the fourth aspect, in a third possible implementation, the system bandwidth includes X subband areas, the identifier information of the first subband area includes X bits of data, and an arrangement order of the X bits of data is corresponding to an arrangement order of the X subband areas, where a data bit corresponding to the first subband area is set to a first identifier, and a data bit corresponding to each subband area in the X subband areas except the first subband area is set to a second identifier, where the first identifier represents a subband area that is used to transmit the measurement pilot signal, the second identifier represents a subband area that is not used to transmit the measurement pilot signal, and X is a natural number; or before the first device sends the identifier information of the first subband area to the second device, the method further includes: splitting, by the first device, a plurality of subband areas included in the system bandwidth into a plurality of subband area sets, where one subband area set includes at least one subband area, and the identifier information of the first subband area includes an identifier of a subband area set to which the first subband area belongs and a sub-identifier of the first subband area in the subband area set; or when the first device transmits the measurement pilot signal using a plurality of consecutive subband areas, the identifier information of the first subband area is generated based on an identifier of a start subband area in the plurality of consecutive subband areas and a quantity of the consecutive subband areas; or the system bandwidth includes X subband areas, the first subband area is the $Y^{th}$ subband area in the X subband areas, and the identifier information of the first subband area is a binary number corresponding to Y, where Y is a natural number.

With reference to the second possible implementation of the fourth aspect, in a fourth possible implementation, the first subband area includes W subbands, the sub-identifier information of the second subband in the first subband area includes W bits of data, and an arrangement order of the W bits of data is corresponding to an arrangement order of the W subbands, where a data bit corresponding to the second subband is set to a first identifier, and a data bit corresponding to each subband in the W subbands except the second subband is set to a second identifier, where the first identifier represents a subband that is used to transmit the measurement pilot signal, the second identifier represents a subband that is not used to transmit the measurement pilot signal, and W is a natural number; or when the first device transmits the measurement pilot signal using a plurality of consecutive second subbands, the sub-identifier information of the second subband in the first subband area is generated based on an identifier of a start subband in the plurality of consecutive subband areas and a quantity of the consecutive subband areas; or the first subband area includes W subbands, the second subband is the $P^{th}$ subband in the W subbands, and the sub-identifier information of the second subband in the first subband area is a binary number corresponding to P, where P is a natural number; or before the first device sends the sub-identifier of the second subband in the first subband area to the second device, the method further includes: splitting, by the first device, a plurality of subbands included in the first subband area into a plurality of subband sets, where one subband set includes at least one subband, and the sub-identifier information of the second subband in the first subband area includes an identifier of a subband set to which the second subband belongs and a sub-identifier of the second subband in the subband set.

With reference to the fourth aspect, or the first possible implementation, the second possible implementation, or the third possible implementation of the fourth aspect, in a fourth possible implementation, the first device is a base station, the second device is user equipment, and the measurement pilot signal is a downlink measurement pilot signal; or the first device is user equipment, the second device is a base station, and the measurement pilot signal is an uplink measurement pilot signal.

According to a fifth aspect, a device for transmitting a measurement pilot signal is provided, including: a first processor, configured to determine, from a plurality of subbands included in entire system bandwidth, a first subband that is used to transmit a measurement pilot signal, and embed the measurement pilot signal in a physical resource block corresponding to the first subband, where one subband includes at least one physical resource block; and a first transceiver, configured to send identifier information of the first subband to a second device, and transmit the measurement pilot signal to the second device.

With reference to the fifth aspect, in a first possible implementation, the system bandwidth includes N subbands, the identifier information of the first subband includes N bits of data, and an arrangement order of the N bits of data is corresponding to an arrangement order of the N subbands, where a data bit corresponding to the first subband is set to a first identifier, and a data bit corresponding to each subband in the N subbands except the first subband is set to a second identifier, where the first identifier represents a subband that is used to transmit the measurement pilot signal, the second identifier represents a subband that is not used to transmit the measurement pilot signal, and N is a natural number; or the plurality of subbands included in the system bandwidth are classified into a plurality of subband sets in advance, where one subband set includes at least one subband, and the identifier information of the first subband includes an identifier of a subband set to which the first subband belongs and a sub-identifier of the first subband in the subband set; or when the measurement pilot signal is transmitted using a plurality of consecutive subbands, the identifier information of the first subband is generated based on an identifier of a start subband in the plurality of consecutive subbands and a quantity of the consecutive subbands; or the system bandwidth includes N subbands, the first subband is the $M^{th}$ subband in the N subbands, and the identifier information of the first subband is a binary number corresponding to M.

With reference to the fifth aspect or the first possible implementation of the fifth aspect, in a second possible implementation, the measurement pilot signal is a downlink measurement pilot signal or an uplink measurement pilot signal.

According to a sixth aspect, a device for transmitting a measurement pilot signal is provided, including: a second transceiver, configured to receive identifier information of a first subband sent by a first device and receive a measurement pilot signal on a determined physical resource block, where the first subband includes a plurality of physical resource blocks, and each physical resource block is used to transmit the measurement pilot signal; and a second processor, configured to determine, based on the identifier information of the first subband, the physical resource block that is used to transmit the measurement pilot signal.

With reference to the sixth aspect, in a first possible implementation, the system bandwidth includes N subbands, the identifier information of the first subband includes N bits of data, and an arrangement order of the N bits of data is corresponding to an arrangement order of the N subbands, where a data bit corresponding to the first subband is set to a first identifier, and a data bit corresponding to each subband in the N subbands except the first subband is set to a second identifier, where the first identifier represents a subband that is used to transmit the measurement pilot signal, the second identifier represents a subband that is not used to transmit the measurement pilot signal, and N is a natural number; or the identifier information of the first subband includes an identifier of a subband set to which the first subband belongs and a sub-identifier of the first subband in the subband set, and the subband set includes at least the first subband; or when the measurement pilot signal is transmitted on a plurality of consecutive subbands, the identifier information of the first subband is generated based on an identifier of a start subband in the plurality of consecutive subbands and a quantity of the consecutive subbands; or the system bandwidth includes N subbands, the first subband is the $M^{th}$ subband in the N subbands, and the identifier information of the first subband is a binary number corresponding to M.

With reference to the sixth aspect or the first possible implementation of the sixth aspect, in a second possible implementation, the measurement pilot signal is a downlink measurement pilot signal or an uplink measurement pilot signal.

According to a seventh aspect, a device for transmitting a measurement pilot signal is provided, including: a third processor, configured to: determine, from a plurality of subbands included in system bandwidth, a first subband area that is used to transmit a measurement pilot signal, and embed the measurement pilot signal in at least one physical resource block corresponding to the first subband area, where one subband includes at least one physical resource block, and the first subband area includes at least one subband; and a third transceiver, configured to send identifier information of the first subband area and the measurement pilot signal to a second device.

With reference to the seventh aspect, in a first possible implementation, when embedding the measurement pilot signal in the at least one physical resource block corresponding to the first subband area, the third processor is specifically configured to embed, according to a preset rule, the measurement pilot signal in the at least one physical resource block corresponding to the first subband area.

With reference to the seventh aspect, in a second possible implementation, the second transmission unit is specifically configured to determine, from the first subband area, a second subband that is used to transmit the measurement pilot signal, and embed the measurement pilot signal in at least one physical resource block corresponding to the second subband; and the third receiver is further configured to send a sub-identifier of the second subband in the first subband area and the measurement pilot signal to the second device.

With reference to the seventh aspect, the first possible implementation of the seventh aspect, or the second possible implementation of the seventh aspect, in a third possible implementation, the system bandwidth includes X subband areas, the identifier information of the first subband area includes X bits of data, and an arrangement order of the X bits of data is corresponding to an arrangement order of the X subband areas, where a data bit corresponding to the first subband area is set to a first identifier, and a data bit corresponding to each subband area in the X subband areas except the first subband area is set to a second identifier, where the first identifier represents a subband area that is used to transmit the measurement pilot signal, the second identifier represents a subband area that is not used to transmit the measurement pilot signal, and X is a natural number; or a plurality of subband areas included in the system bandwidth are classified into a plurality of subband area sets in advance, where one subband area set includes at least one subband area, and the identifier information of the first subband area includes an identifier of a subband area set to which the first subband area belongs and a sub-identifier of the first subband area in the subband area set; or when the measurement pilot signal is transmitted using a plurality of consecutive subband areas, the identifier information of the first subband area is generated based on an identifier of a start subband area in the plurality of consecutive subband areas and a quantity of the consecutive subband areas; or the system bandwidth includes X subband areas, the first subband area is the $Y^{th}$ subband area in the X subband areas, and the identifier information of the first subband area is a binary number corresponding to Y, where Y is a natural number.

With reference to the second possible implementation of the seventh aspect, in a fourth possible implementation, the first subband area includes W subbands, the sub-identifier information of the second subband in the first subband area includes W bits of data, and an arrangement order of the W bits of data is corresponding to an arrangement order of the W subbands, where a data bit corresponding to the second subband is set to a first identifier, and a data bit corresponding to each subband in the W subbands except the second subband is set to a second identifier, where the first identifier represents a subband that is used to transmit the measurement pilot signal, the second identifier represents a subband that is not used to transmit the measurement pilot signal, and W is a natural number; or when the measurement pilot signal is transmitted using a plurality of consecutive second subbands, the sub-identifier information of the second subband in the first subband area is generated based on an identifier of a start subband in the plurality of consecutive subband areas and a quantity of the consecutive subband areas; or the first subband area includes W subbands, the second subband is the $P^{th}$ subband in the W subbands, and the sub-identifier information of the second subband in the first subband area is a binary number corresponding to P, where P is a natural number; or a plurality of subbands included in the first subband area are classified into a plurality of subband sets in advance, where one subband set includes at least one subband, and the sub-identifier information of the second subband in the first subband area includes an identifier of a subband set to which the second subband belongs and a sub-identifier of the second subband in the subband set.

With reference to the seventh aspect, the first possible implementation of the seventh aspect, the second possible implementation of the seventh aspect, the third possible implementation of the seventh aspect, or the fourth possible implementation of the seventh aspect, in a fifth possible implementation, the measurement pilot signal is a downlink measurement pilot signal or an uplink measurement pilot signal.

According to an eighth aspect, a device for transmitting a measurement pilot signal is provided, including: a fourth transceiver, configured to receive identifier information of a first subband area sent by a first device and receive a measurement pilot signal on a determined physical resource block, where the first subband area includes at least one subband, and one subband includes at least one physical resource block; and a fourth processor, configured to determine, based on the identifier information of the first subband area, the physical resource block that is used to transmit the measurement pilot signal.

With reference to the eighth aspect, in a first possible implementation of the eighth aspect, when determining, based on the identifier information of the first subband area, the physical resource block that is used to transmit the measurement pilot signal, the fourth processor is specifically configured to determine, based on the identifier information of the first subband area and according to a preset rule, the physical resource block that is used to transmit the measurement pilot signal.

With reference to the eighth aspect, in a second possible implementation of the eighth aspect, the fourth transceiver is further configured to receive sub-identifier information, sent by the first device, of a second subband in the first subband area, where the second subband is used to transmit the measurement pilot signal; and when determining, based on the identifier information of the first subband area, the physical resource block that is used to transmit the measurement pilot signal, the fourth processor is specifically configured to determine, based on the identifier of the first subband area and the sub-identifier of the second subband, the physical resource block that is used to transmit the measurement pilot signal.

With reference to the eighth aspect, the first possible implementation of the eighth aspect, or the second possible implementation of the eighth aspect, in a third possible implementation, the system bandwidth includes X subband areas, the identifier information of the first subband area includes X bits of data, and an arrangement order of the X bits of data is corresponding to an arrangement order of the X subband areas, where a data bit corresponding to the first subband area is set to a first identifier, and a data bit corresponding to each subband area in the X subband areas except the first subband area is set to a second identifier, where the first identifier represents a subband area that is used to transmit the measurement pilot signal, the second identifier represents a subband area that is not used to transmit the measurement pilot signal, and X is a natural number; or a plurality of subband areas included in the system bandwidth are classified into a plurality of subband area sets in advance, where one subband area set includes at least one subband area, and the identifier information of the first subband area includes an identifier of a subband area set to which the first subband area belongs and a sub-identifier of the first subband area in the subband area set; or when the measurement pilot signal is transmitted using a plurality of consecutive subband areas, the identifier information of the first subband area is generated based on an identifier of a start subband area in the plurality of consecutive subband areas and a quantity of the consecutive subband areas; or the system bandwidth includes X subband areas, the first subband area is the $Y^{th}$ subband area in the X subband areas, and the identifier information of the first subband area is a binary number corresponding to Y, where Y is a natural number.

With reference to the second possible implementation of the eighth aspect, in a fourth possible implementation, the first subband area includes W subbands, the sub-identifier information of the second subband in the first subband area includes W bits of data, and an arrangement order of the W bits of data is corresponding to an arrangement order of the W subbands, where a data bit corresponding to the second subband is set to a first identifier, and a data bit corresponding to each subband in the W subbands except the second subband is set to a second identifier, where the first identifier represents a subband that is used to transmit the measurement pilot signal, the second identifier represents a subband that is not used to transmit the measurement pilot signal, and W is a natural number; or when the measurement pilot signal is transmitted using a plurality of consecutive second subbands, the sub-identifier information of the second subband in the first subband area is generated based on an identifier of a start subband in the plurality of consecutive subband areas and a quantity of the consecutive subband areas; or the first subband area includes W subbands, the second subband is the $P^{th}$ subband in the W subbands, and the sub-identifier information of the second subband in the first subband area is a binary number corresponding to P, where P is a natural number; or a plurality of subbands included in the first subband area are classified into a plurality of subband sets in advance, where one subband set includes at least one subband, and the sub-identifier information of the second subband in the first subband area includes an identifier of a subband set to which the second subband belongs and a sub-identifier of the second subband in the subband set.

With reference to the eighth aspect, or the first possible implementation, the second possible implementation, or the third possible implementation of the eighth aspect, in a fourth possible implementation, the measurement pilot signal is a downlink measurement pilot signal or an uplink measurement pilot signal.

It can be learned from the foregoing descriptions that, in the embodiments of this application, first, the first device divides the entire system bandwidth into different subbands, and each subband occupies at least one PRB. Then, from the entire system, the first device determines the first subband that is used to transmit the measurement pilot signal, and sends the identifier information of the first subband to the second device. Finally, the first device embeds the measurement pilot signal in the PRB corresponding to the first subband, and transmits the PRB embedded with the measurement pilot signal to the second device. Correspondingly, the second device may demodulate the measurement pilot signal from a plurality of received PRBs based on the identifier of the first subband. It can be learned that, with the method disclosed in the embodiments of this application, a measurement pilot signal can be transmitted on partial bandwidth.

DESCRIPTION OF EMBODIMENTS

Figure 1:
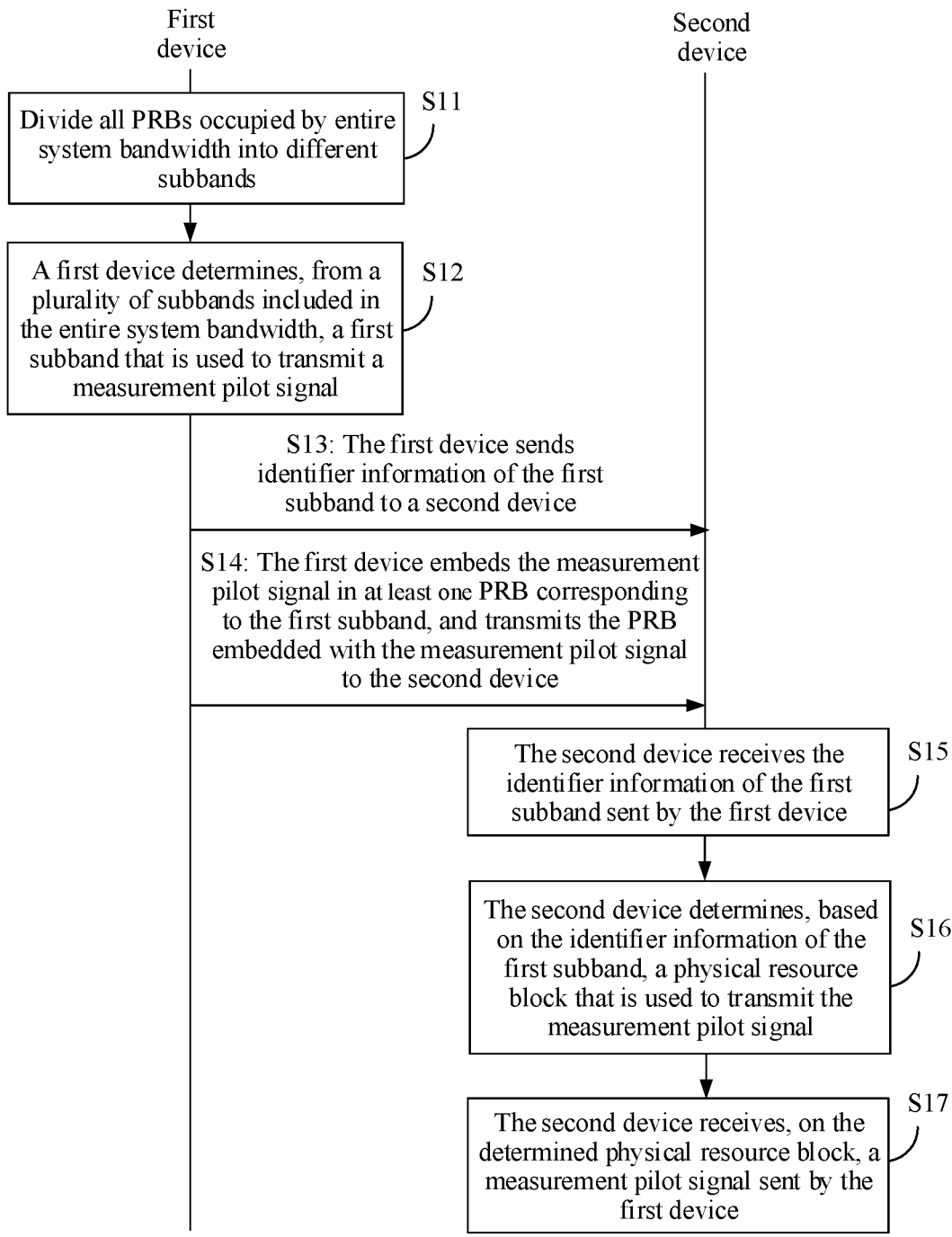
FIG. 1 is a schematic flowchart of a method for transmitting a measurement pilot signal according to an embodiment of this application.

The following describes the technical solutions in the embodiments of this application with reference to the accompanying drawings in the embodiments of this application.

The embodiments of this application provide a method and a device for transmitting a measurement pilot signal. First, application scenarios of this application are described.

1. The embodiments of this application may be applied to downlink measurement pilot signal transmission. A specific application scenario is as follows: In an existing LTE system, a base station normally sends a downlink measurement pilot signal (for example, a CSI-RS in LTE Release 10) for estimation of state information of a downlink channel, to help resource scheduling for the UE. In the existing LTE system, the downlink measurement pilot signal sent by the base station is transmitted on full bandwidth. In other words, the downlink measurement pilot signal is transmitted on entire system bandwidth of the LTE system. In an LTE system, system bandwidth of the LTE system usually occupies a plurality of physical resource block (PRBs). Therefore, in the existing LTE system, a downlink measurement pilot signal needs to be embedded in each PRB of the LTE system bandwidth. However, in a future 5G communications system, to reduce complexity of data processing by a terminal, it may be specified that the terminal transmits data only on partial bandwidth, and for these terminals, they only need to be configured to transmit a downlink measurement pilot signal on partial bandwidth. In addition, in a future 5G communications system, a plurality of services are combined to be transmitted on one system bandwidth. For a terminal that transmits only one type of service, its data transmission occupies only partial bandwidth. For such terminals too, they only need to transmit a downlink measurement pilot signal on partial bandwidth for transmitting data.

2. The embodiments of this application may be applied to uplink measurement pilot signal transmission. A specific application scenario is as follows: In an existing LTE system, a terminal normally sends an uplink measurement pilot signal (for example, an SRS in LTE Release 10) for estimation of state information of an uplink channel. In the existing LTE system, an uplink measurement pilot signal sent by the terminal is transmitted on full bandwidth or partial bandwidth. When the uplink measurement pilot signal is transmitted on full bandwidth, the uplink measurement pilot signal is embedded in all PRBs occupied by entire system bandwidth. This manner is able to fulfill a requirement for transmitting an uplink measurement pilot signal on some PRBs of system bandwidth in a future 5G system. When the uplink measurement pilot signal is transmitted on partial bandwidth, it is usually pre-agreed upon by the base station and the terminal that the uplink measurement pilot signal is transmitted on consecutive fixed PRBs of the entire system bandwidth. In this manner, the uplink measurement pilot signal cannot be transmitted on inconsecutive PRBs.

Embodiment 1

Based on the foregoing application scenarios, this embodiment of this application provides a method for transmitting a measurement pilot signal. The method may be applied to both uplink measurement pilot signal transmission and downlink measurement pilot signal transmission. When the method provided in this embodiment of this application is applied to uplink measurement pilot signal transmission, a first device is a base station and a second device is user equipment in this embodiment of this application. When the method provided in this embodiment of this application is applied to downlink measurement pilot signal transmission, a first device is user equipment and a second device is a base station in this embodiment of this application. As shown in FIG. 1, the method for transmitting a measurement pilot signal provided in this embodiment of this application is specifically as follows:

Step S11: A first device divides all PRBs occupied by entire system bandwidth into different subbands, where one subband may occupy at least one PRB.

In this embodiment of this application, a subband granularity may be preset (the subband granularity is a quantity of PRBs occupied by each subband), and then subband division is performed based on the preset subband granularity. For example, if the entire system bandwidth occupies 100 PRBs, and the preset subband granularity is five PRBs, the entire system bandwidth may be divided into 20 subbands. In this embodiment of this application, the subband granularity may be related to one or more of system bandwidth, a channel state information feedback granularity (for example, a granularity of a channel information state feedback such as a CQI and a PMI in LTE), a granularity of resource scheduling by a base station, and PRB bundling (the PRB bundling is a quantity of PRBs for joint channel estimation by a terminal). In this embodiment of this application, there is a positive correlation between the subband granularity and the system bandwidth. To be specific, wider system bandwidth indicates a coarser subband granularity. However, there is an integer multiple relationship between the subband granularity and the channel state feedback granularity, the granularity of the resource scheduling by the base station, or the PRB bundling.

Step S12: The first device determines, from a plurality of subbands included in the entire system bandwidth, a first subband that is used to transmit a measurement pilot signal.

In this embodiment of this application, a user may set, based on an actual requirement, a subband that is used to transmit the measurement pilot signal. In this embodiment of this application, for ease of differentiation and description, the subband that is used to transmit the measurement pilot signal is referred to as the first subband.

Step S13: The first device sends identifier information of the first subband to a second device.

In this embodiment of this application, for a manner of determining the identifier of the first subband, refer to the descriptions in Embodiment 2.

Step S14: The first device embeds the measurement pilot signal in a PRB corresponding to the first subband, and transmits the PRB embedded with the measurement pilot signal to the second device.

In this embodiment of this application, specifically, a prior-art method may be used to embed the measurement pilot signal in the PRB corresponding to the first subband. It can be learned from the foregoing descriptions that the first subband may include at least one PRB. In this embodiment of this application, the measurement pilot signal may be specifically embedded in all PRBs corresponding to the first subband. For example, in this embodiment of this application, if the first subband includes five PRBs, the measurement pilot signal may be specifically embedded in each of the five PRBs included in the first subband.

Step S15: The second device receives the identifier information of the first subband sent by the first device, where the first subband includes a plurality of physical resource blocks, and each physical resource block is used to transmit the measurement pilot signal.

Step S16: The second device determines, based on the identifier information of the first subband, a physical resource block that is used to transmit the measurement pilot signal.

Step S17: The second device receives, on the determined physical resource block, a measurement pilot signal sent by the first device.

In this embodiment of this application, for example, if the entire system bandwidth occupies 100 PRBs, the first device transmits data on 100 consecutive PRBs. In other words, in time domain, the first device transmits 100 PRBs at a time. In this case, the second device may first divide the 100 PRBs into a plurality of subbands in a subband division manner pre-negotiated with the first device. For example, as described above, the entire system bandwidth is still divided into 20 subbands, each subband includes five PRBs, and the identifier, transmitted by the first device, of the first subband that is used to transmit the measurement pilot signal is 3. In this embodiment of this application, the second device may sequentially arrange the 20 subbands: a subband 1, a subband 2, . . . , and a subband 20, and then demodulate the measurement pilot signal from a PRB corresponding to the subband 3.

It can be learned from the foregoing descriptions that, in this embodiment of this application, first, the first device divides the entire system bandwidth into different subbands, and each subband occupies at least one PRB. Then, from the entire system, the first device determines the first subband that is used to transmit the measurement pilot signal, and sends the identifier information of the first subband to the second device. Finally, the first device embeds the measurement pilot signal in the PRB corresponding to the first subband, and transmits the PRB embedded with the measurement pilot signal to the second device. Correspondingly, the second device may demodulate the measurement pilot signal from a plurality of received PRBs based on the identifier of the first subband. It can be learned that, with the method disclosed in this embodiment of this application, a measurement pilot signal can be transmitted on partial bandwidth. In addition, compared with an existing manner of transmitting an uplink measurement pilot signal on a fixed PRB, the manner in this application is more flexible.

Embodiment 2

In this embodiment of this application, how the first device transmits the identifier of the first subband in Embodiment 1 is further described. Specifically, the following several manners are provided:

Manner 1: If the entire system bandwidth includes N subbands, the identifier information of the first subband includes N bits of data, and an arrangement order of the N bits of data is corresponding to an arrangement order of the N subbands, where a data bit corresponding to the first subband is set to a first identifier, and a data bit corresponding to each subband in the N subbands except the first subband is set to a second identifier, where the first identifier represents a subband that is used to transmit the measurement pilot signal, the second identifier represents a subband that is not used to transmit the measurement pilot signal, and N is a natural number.

For example, if the entire system bandwidth includes 10 subbands: a subband 1, a subband 2, a subband 3, . . . , and a subband 10, and it is determined that the measurement pilot signal is transmitted on the subband 1 and the subband 3, the identifier information of the first subband may specifically include 10 bits, a first bit and a third bit assume the first identifier, and a second bit and a fourth bit to a tenth bit assume the second identifier. In this embodiment of this application, if the first identifier is 1, and the second identifier is 0, the identifier information of the first subband may be specifically 1010000000.

Manner 2: The first device classifies the plurality of subbands included in the entire system into different subband sets in advance, where one subband set includes at least one subband, and the identifier information of the first subband may specifically include an identifier of a subband set to which the first subband belongs and a sub-identifier of the first subband in the subband set.

Figure 2:
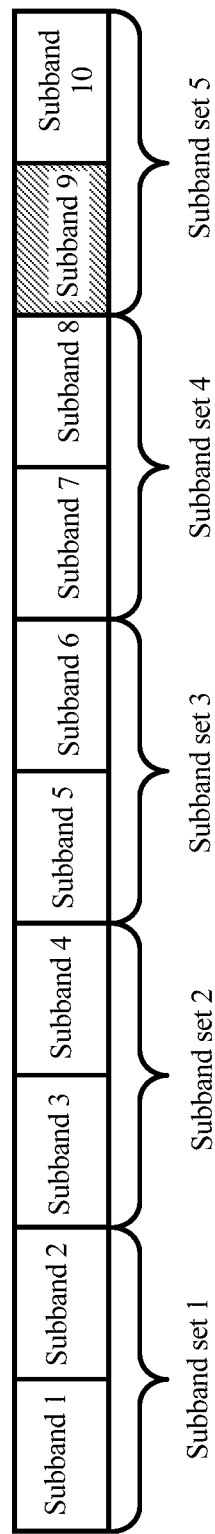
FIG. 2 is a schematic diagram of sending a subband identifier according to an embodiment of this application.

In this embodiment of this application, as described above, if the entire system bandwidth still includes 10 subbands: a subband 1, a subband 2, a subband 3, . . . , and a subband 10, the 10 subbands may be classified into a plurality of subband sets, and a user may set a granularity for subband set division depending on actual application. For example, if a granularity of a subband set is 2, the 10 subbands may be classified into five subband sets, and one subband set includes two subbands. For details, refer to FIG. 2. In this case, if the measurement pilot signal needs to be transmitted on the subband 9, the identifier of the first subband may be specifically 10010. In this case, the first three bits 100 are corresponding to a subband set 5, and 10 represents a sub-identifier of the subband 9 in the subband set 5.

Manner 3: In this embodiment of this application, when the first device transmits the measurement pilot signal using a plurality of consecutive subbands, the identifier information of the first subband may be specifically generated based on an identifier of a start subband in the plurality of consecutive subbands and a quantity of the consecutive subbands.

In this embodiment of this application, if the start subband in the plurality of consecutive subbands that are used to transmit the measurement pilot signal is $N\_RB_{start}$, and the quantity of the consecutive subbands is $L_{CRBs}$, a relationship among the identifier information RIV of the first subband, $N\_RB_{start}$, and $L_{CRBs}$ is as follows:

if $(L_{CRBs}-1) \leq \lfloor M/2 \rfloor$ then $$RIV = M(L_{CRBs}-1) + N\_RB_{start}$$

else $$RIV = M(M\ L_{CRBs}+1) + (M-1-N_{start})$$

where $L_{CRBs} \geq 1$ and shall not exceed $M - N\_RB_{start}$, and M represents a quantity of subbands included in the entire system.

In this embodiment of this application, if the entire system includes 10 subbands, and it is determined that the measurement pilot signal is transmitted on a subband 2 and a subband 3, $N\_RB_{start}=2$ and $L_{CRBs}=12$ may be determined. In this case, M=10, $N\_RB_{start}=2$, and $L_{CRBs}=2$ are substituted into the foregoing formula to find that $RIV=_{12}$, and a binary number 001100 corresponding to 12 may be used as the identifier of the first subband.

Manner 4: In this embodiment of this application, if the entire system bandwidth includes N subbands, the first subband is the $M^{th}$ subband in the N subbands, and the identifier information of the first subband is a binary number corresponding to M.

In this embodiment of this application, as described above, if the entire system still includes 10 subbands, and it is determined that a subband 8 is used to transmit the measurement pilot signal, the identifier information of the first subband may be specifically 0111 (0111 is a binary number corresponding to the decimal 8).

In this embodiment of this application, the user may select, as required, any one of the foregoing manners to determine the identifier of the first subband, so that the first subband can be flexibly identified.

Embodiment 3

Figure 3:
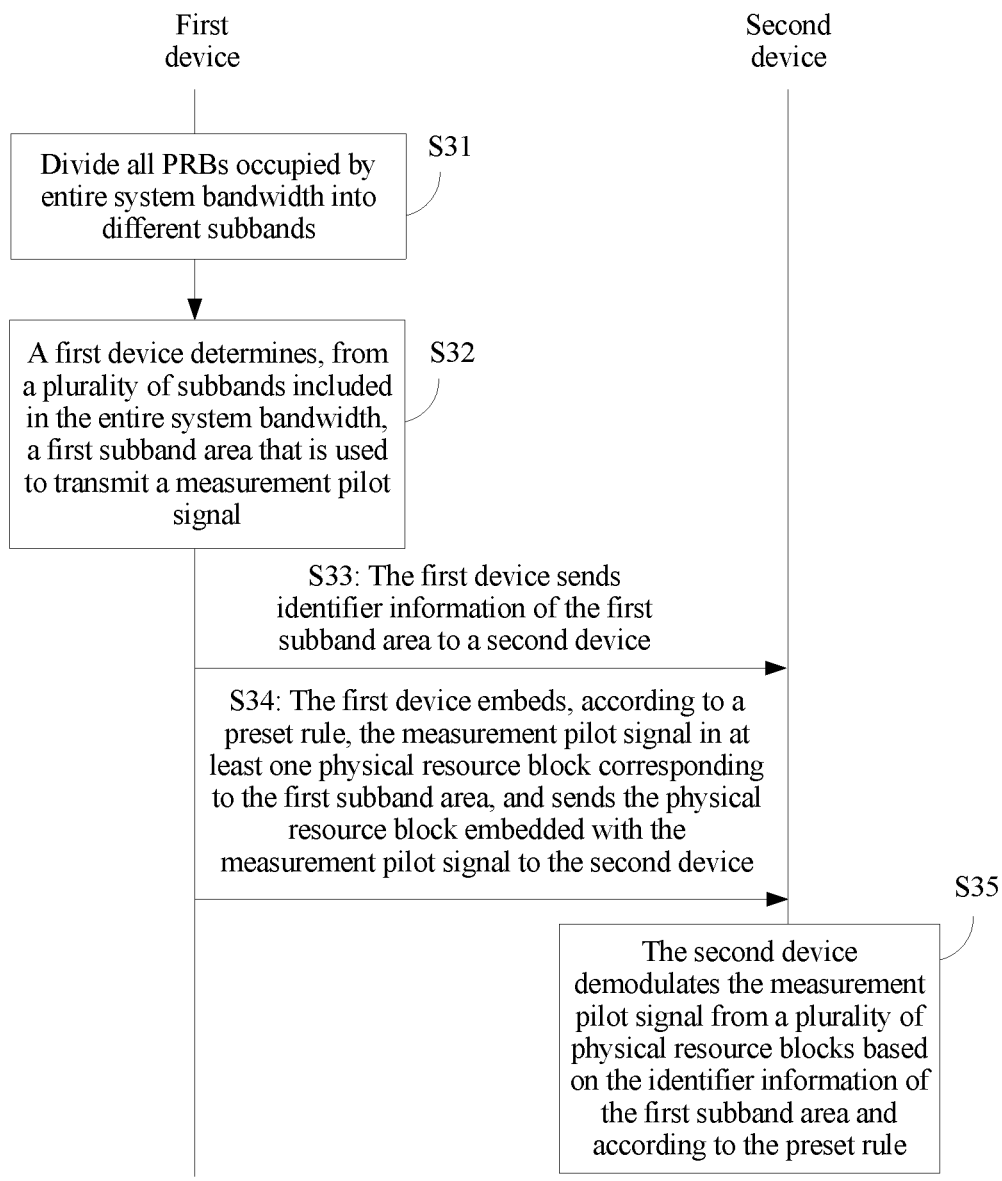
FIG. 3 is another schematic flowchart of a method for transmitting a measurement pilot signal according to an embodiment of this application.

This embodiment of this application further provides a method for transmitting a measurement pilot signal. The method may also be applied to both uplink measurement pilot signal transmission and downlink measurement pilot signal transmission. When the method provided in this embodiment of this application is applied to uplink measurement pilot signal transmission, a first device is a base station and a second device is user equipment in this embodiment of this application. When the method provided in this embodiment of this application is applied to downlink measurement pilot signal transmission, a first device is user equipment and a second device is a base station in this embodiment of this application. As shown in FIG. 3, the method for transmitting a measurement pilot signal provided in this embodiment of this application is specifically as follows:

Step S31: A first device divides all PRBs occupied by entire system bandwidth into different subbands, where one subband may occupy at least one PRB.

In this embodiment of this application, for subband division, refer to the descriptions in Embodiment 1. Details are not described herein again.

Step S32: The first device determines, from a plurality of subbands included in the entire system bandwidth, a first subband area that is used to transmit a measurement pilot signal, where the first subband area includes at least one subband.

In this embodiment of this application, the first device may plan, in advance, partial bandwidth for transmitting the measurement pilot signal in the entire system bandwidth. For example, if the entire system bandwidth includes 10 subbands, and the first device may plan subbands 6 to 10 for transmitting the measurement pilot signal in the 10 subbands, the subbands 6 to 10 are the first subband area in step S32.

Step S33: The first device sends identifier information of the first subband area to a second device.

In this embodiment of this application, the first subband area may be specifically identified using the following manners.

Manner 1: If the entire system bandwidth includes X subband areas, the identifier information of the first subband area may specifically include X bits of data, and an arrangement order of the X bits of data is corresponding to an arrangement order of the X subband areas, where a data bit corresponding to the first subband area is set to a first identifier, and a data bit corresponding to each subband area in the X subband areas except the first subband area is set to a second identifier, where the first identifier represents a subband area that is used to transmit the measurement pilot signal, the second identifier represents a subband area that is not used to transmit the measurement pilot signal, and X is a natural number.

Manner 2: The first device classifies a plurality of subband areas included in the entire system bandwidth into a plurality of subband area sets in advance, where one subband area set includes at least one subband area, and the identifier information of the first subband area may specifically include an identifier of a subband area set to which the first subband area belongs and a sub-identifier of the first subband area in the subband area set.

Manner 3: When the first device transmits the measurement pilot signal using a plurality of consecutive subband areas, the identifier information of the first subband area is generated based on an identifier of a start subband area in the plurality of consecutive subband areas and a quantity of the consecutive subband areas.

Manner 4: If the entire system bandwidth includes X subband areas, the first subband area is the $Y^{th}$ subband area in the X subband areas, and the identifier information of the first subband area is a binary number corresponding to Y, where Y is a natural number.

In this embodiment of this application, for the foregoing four manners, refer to the descriptions in Embodiment 2. Details are not described herein again.

Step S34: The first device embeds, according to a preset rule, the measurement pilot signal in at least one physical resource block corresponding to the first subband area, and sends the measurement pilot signal to the second device.

In this embodiment of this application, a user may set the preset rule based on an actual requirement. For example, the preset rule may specify that the measurement pilot signal is transmitted on a fixed subband in the first subband area, or the preset rule may specify that the measurement pilot signal is sent on all subbands in the first subband area in turn. For example, if the first subband area includes five subbands, the preset rule may specifically specify that the measurement pilot signal is transmitted on a second subband in the foregoing five subbands or that the measurement pilot signal is sent on all the five subbands in turn.

Step S35: The second device demodulates the measurement pilot signal from the plurality of physical resource blocks based on the identifier information of the first subband area and according to the preset rule.

It can be learned from the foregoing descriptions that, in this embodiment of this application, the first device needs to send the identifier information of the first subband area to the second device only once, and a quantity of bits occupied by the identifier information of the first subband area is less than a quantity of bits occupied by identifier information of the first subband. Therefore, using the method disclosed in this application can reduce system overheads.

Embodiment 4

Figure 4:
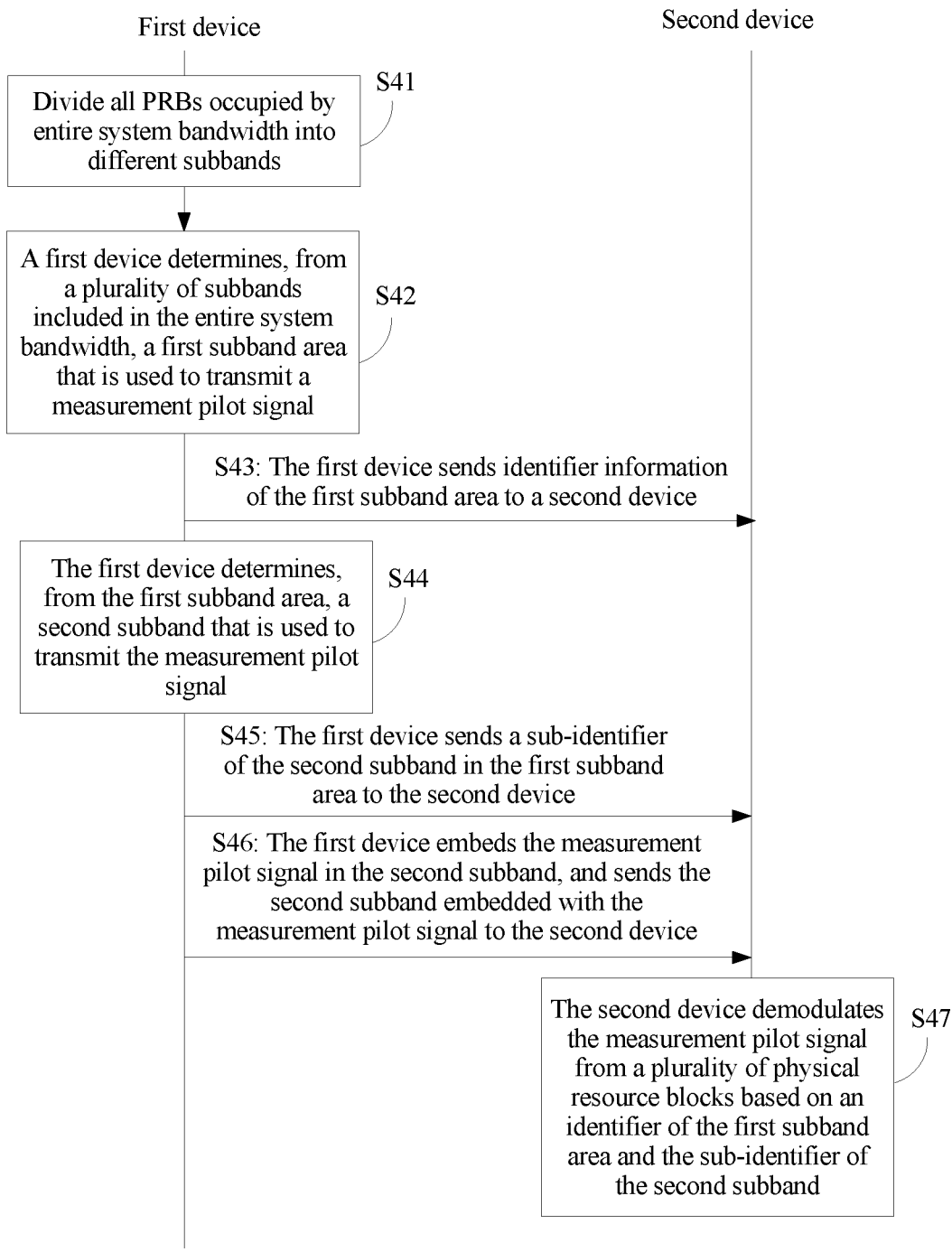
FIG. 4 is still another schematic flowchart of a method for transmitting a measurement pilot signal according to an embodiment of this application.

This embodiment of this application further provides a method for transmitting a measurement pilot signal. The method may also be applied to both uplink measurement pilot signal transmission and downlink measurement pilot signal transmission. When the method provided in this embodiment of this application is applied to uplink measurement pilot signal transmission, a first device is a base station and a second device is user equipment in this embodiment of this application. When the method provided in this embodiment of this application is applied to downlink measurement pilot signal transmission, a first device is user equipment and a second device is a base station in this embodiment of this application. As shown in FIG. 4, the method for transmitting a measurement pilot signal provided in this embodiment of this application is specifically as follows:

Step S41: A first device divides all PRBs occupied by entire system bandwidth into different subbands, where one subband may occupy at least one PRB.

In this embodiment of this application, for subband division, refer to the descriptions in Embodiment 1. Details are not described herein again.

Step S42: The first device determines, from a plurality of subbands included in the entire system bandwidth, a first subband area that is used to transmit a measurement pilot signal, where the first subband area includes at least one subband.

In this embodiment of this application, for division of the first subband area, refer to the descriptions in Embodiment 3. Details are not described herein again.

Step S43: The first device sends identifier information of the first subband area to a second device.

In this embodiment of this application, the first subband area may be specifically identified using the following manners.

Manner 1: If the entire system bandwidth includes X subband areas, the identifier information of the first subband area may specifically include X bits of data, and an arrangement order of the X bits of data is corresponding to an arrangement order of the X subband areas, where a data bit corresponding to the first subband area is set to a first identifier, and a data bit corresponding to each subband area in the X subband areas except the first subband area is set to a second identifier, where the first identifier represents a subband area that is used to transmit the measurement pilot signal, the second identifier represents a subband area that is not used to transmit the measurement pilot signal, and X is a natural number.

Manner 2: The first device classifies a plurality of subband areas included in the entire system bandwidth into a plurality of subband area sets in advance, where one subband area set includes at least one subband area, and the identifier information of the first subband area may specifically include an identifier of a subband area set to which the first subband area belongs and a sub-identifier of the first subband area in the subband area set.

Manner 3: When the first device transmits the measurement pilot signal using a plurality of consecutive subband areas, the identifier information of the first subband area is generated based on an identifier of a start subband area in the plurality of consecutive subband areas and a quantity of the consecutive subband areas.

Manner 4: If the entire system bandwidth includes X subband areas, the first subband area is the $Y^{th}$ subband area in the X subband areas, and the identifier information of the first subband area is a binary number corresponding to Y, where Y is a natural number.

In this embodiment of this application, for the foregoing four manners, refer to the descriptions in Embodiment 2. Details are not described herein again.

Step S44: The first device determines, from the first subband area, a second subband that is used to transmit the measurement pilot signal.

Step S45: The first device sends a sub-identifier of the second subband in the first subband area to the second device.

In this embodiment of this application, the sub-identifier of the second subband in the first subband area may be specifically determined in the following manners.

Manner 1: If the first subband area includes W subbands, the sub-identifier information of the second subband in the first subband area includes W bits of data, and an arrangement order of the W bits of data is corresponding to an arrangement order of the W subbands, where a data bit corresponding to the second subband is set to a first identifier, and a data bit corresponding to each subband in the W subbands except the second subband is set to a second identifier, where the first identifier represents a subband that is used to transmit the measurement pilot signal, the second identifier represents a subband that is not used to transmit the measurement pilot signal, and W is a natural number.

Manner 2: When the first device transmits the measurement pilot signal using a plurality of consecutive second subbands, the sub-identifier information of the second subband in the first subband area is generated based on an identifier of a start subband in the plurality of consecutive subband areas and a quantity of the consecutive subband areas.

Manner 3: If the first subband area includes W subbands, and the second subband is the $P^{th}$ subband in the W subbands, the sub-identifier information of the second subband in the first subband area is a binary number corresponding to P, where P is a natural number.

Manner 4: The first device classifies a plurality of subbands included in the first subband area into a plurality of subband sets in advance, where one subband set includes at least one subband, and the sub-identifier information of the second subband in the first subband area includes an identifier of a subband set to which the second subband belongs and a sub-identifier of the second subband in the subband set.

Step S46: The first device embeds the measurement pilot signal in the second subband, and sends the second subband embedded with the measurement pilot signal to the second device.

Step S47: The second device demodulates the measurement pilot signal from the plurality of physical resource blocks based on the identifier of the first subband area and the sub-identifier of the second subband.

It can be learned from the foregoing descriptions that, in this embodiment of this application, the first device first transmits the identifier of the first subband area to the second device, and then the first device transmits the sub-identifier of the second subband in the first subband area to the second device. With the method in this embodiment of this application, overheads for sending an identifier of the second subband can be reduced with ensured flexibility of measurement pilot signal transmission.

Embodiment 5

Figure 5:
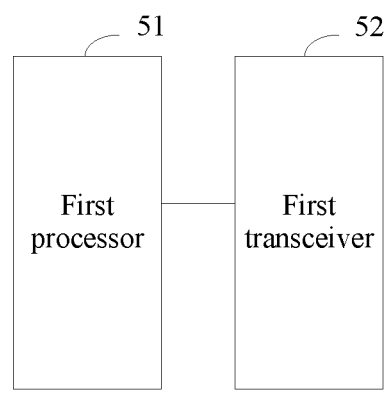
FIG. 5 is a schematic structural diagram of a device for transmitting a measurement pilot signal according to an embodiment of this application.

Same as the foregoing idea, as shown in FIG. 5, this embodiment of this application further provides a device for transmitting a measurement pilot signal, including:

a first processor 51, configured to: determine, from a plurality of subbands included in entire system bandwidth, a first subband that is used to transmit a measurement pilot signal, and embed the measurement pilot signal in a physical resource block corresponding to the first subband, where one subband includes at least one physical resource block; and a first transceiver 52, configured to: send identifier information of the first subband to a second device, and transmit the measurement pilot signal to the second device.

Specifically, the system bandwidth includes N subbands, the identifier information of the first subband includes N bits of data, and an arrangement order of the N bits of data is corresponding to an arrangement order of the N subbands, where a data bit corresponding to the first subband is set to a first identifier, and a data bit corresponding to each subband in the N subbands except the first subband is set to a second identifier, where the first identifier represents a subband that is used to transmit the measurement pilot signal, the second identifier represents a subband that is not used to transmit the measurement pilot signal, and N is a natural number; or the plurality of subbands included in the system bandwidth are classified into a plurality of subband sets in advance, where one subband set includes at least one subband, and the identifier information of the first subband includes an identifier of a subband set to which the first subband belongs and a sub-identifier of the first subband in the subband set; or when the measurement pilot signal is transmitted using a plurality of consecutive subbands, the identifier information of the first subband is generated based on an identifier of a start subband in the plurality of consecutive subbands and a quantity of the consecutive subbands; or the system bandwidth includes N subbands, the first subband is the $M^{th}$ subband in the N subbands, and the identifier information of the first subband is a binary number corresponding to M.

Specifically, the measurement pilot signal is a downlink measurement pilot signal or an uplink measurement pilot signal.

Figure 6:
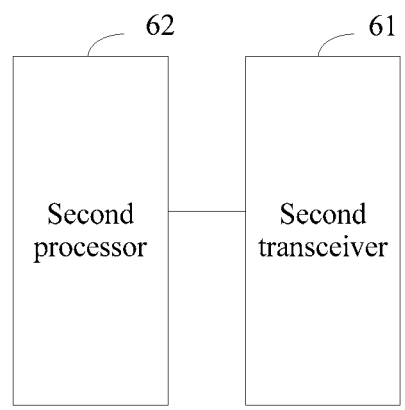
FIG. 6 is another schematic structural diagram of a device for transmitting a measurement pilot signal according to an embodiment of this application.

Same as the foregoing concept, as shown in FIG. 6, this embodiment of this application further provides a device for transmitting a measurement pilot signal, including:

a second transceiver 61, configured to receive identifier information of a first subband sent by a first device and receive a measurement pilot signal on a determined physical resource block, where the first subband includes a plurality of physical resource blocks, and each physical resource block is used to transmit the measurement pilot signal; and a second processor 62, configured to determine, based on the identifier information of the first subband, the physical resource block that is used to transmit the measurement pilot signal.

Specifically, the system bandwidth includes N subbands, the identifier information of the first subband includes N bits of data, and an arrangement order of the N bits of data is corresponding to an arrangement order of the N subbands, where a data bit corresponding to the first subband is set to a first identifier, and a data bit corresponding to each subband in the N subbands except the first subband is set to a second identifier, where the first identifier represents a subband that is used to transmit the measurement pilot signal, the second identifier represents a subband that is not used to transmit the measurement pilot signal, and N is a natural number; or the identifier information of the first subband includes an identifier of a subband set to which the first subband belongs and a sub-identifier of the first subband in the subband set, and the subband set includes at least the first subband; or when the measurement pilot signal is transmitted on a plurality of consecutive subbands, the identifier information of the first subband is generated based on an identifier of a start subband in the plurality of consecutive subbands and a quantity of the consecutive subbands; or the system bandwidth includes N subbands, the first subband is the $M^{th}$ subband in the N subbands, and the identifier information of the first subband is a binary number corresponding to M.

Specifically, the measurement pilot signal is a downlink measurement pilot signal or an uplink measurement pilot signal.

Figure 7:
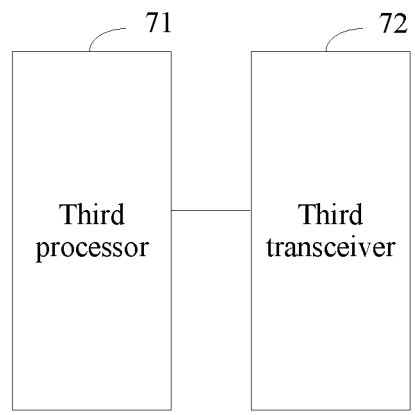
FIG. 7 is still another schematic structural diagram of a device for transmitting a measurement pilot signal according to an embodiment of this application.

Same as the foregoing concept, as shown in FIG. 7, this embodiment of this application further provides a device for transmitting a measurement pilot signal, including:

a third processor 71, configured to: determine, from a plurality of subbands included in system bandwidth, a first subband area that is used to transmit a measurement pilot signal, and embed the measurement pilot signal in at least one physical resource block corresponding to the first subband area, where one subband includes at least one physical resource block, and the first subband area includes at least one subband; and a third transceiver 72, configured to send identifier information of the first subband area and the measurement pilot signal to a second device.

Specifically, when embedding the measurement pilot signal in the at least one physical resource block corresponding to the first subband area, the third processor is specifically configured to embed, according to a preset rule, the measurement pilot signal in the at least one physical resource block corresponding to the first subband area.

Specifically, when embedding the measurement pilot signal in the at least one physical resource block corresponding to the first subband area, the third processor is specifically configured to determine, from the first subband area, a second subband that is used to transmit the measurement pilot signal, and embed the measurement pilot signal in at least one physical resource block corresponding to the second subband; and the third receiver is further configured to send a sub-identifier of the second subband in the first subband area and the measurement pilot signal to the second device.

Specifically, the system bandwidth includes X subband areas, the identifier information of the first subband area includes X bits of data, and an arrangement order of the X bits of data is corresponding to an arrangement order of the X subband areas, where a data bit corresponding to the first subband area is set to a first identifier, and a data bit corresponding to each subband area in the X subband areas except the first subband area is set to a second identifier, where the first identifier represents a subband area that is used to transmit the measurement pilot signal, the second identifier represents a subband area that is not used to transmit the measurement pilot signal, and X is a natural number; or a plurality of subband areas included in the system bandwidth are classified into a plurality of subband area sets in advance, where one subband area set includes at least one subband area, and the identifier information of the first subband area includes an identifier of a subband area set to which the first subband area belongs and a sub-identifier of the first subband area in the subband area set; or when the measurement pilot signal is transmitted using a plurality of consecutive subband areas, the identifier information of the first subband area is generated based on an identifier of a start subband area in the plurality of consecutive subband areas and a quantity of the consecutive subband areas; or the system bandwidth includes X subband areas, the first subband area is the $Y^{th}$ subband area in the X subband areas, and the identifier information of the first subband area is a binary number corresponding to Y, where Y is a natural number.

Specifically, the first subband area includes W subbands, the sub-identifier information of the second subband in the first subband area includes W bits of data, and an arrangement order of the W bits of data is corresponding to an arrangement order of the W subbands, where a data bit corresponding to the second subband is set to a first identifier, and a data bit corresponding to each subband in the W subbands except the second subband is set to a second identifier, where the first identifier represents a subband that is used to transmit the measurement pilot signal, the second identifier represents a subband that is not used to transmit the measurement pilot signal, and W is a natural number; or when the measurement pilot signal is transmitted using a plurality of consecutive second subbands, the sub-identifier information of the second subband in the first subband area is generated based on an identifier of a start subband in the plurality of consecutive subband areas and a quantity of the consecutive subband areas; or the first subband area includes W subbands, the second subband is the $P^{th}$ subband in the W subbands, and the sub-identifier information of the second subband in the first subband area is a binary number corresponding to P, where P is a natural number; or a plurality of subbands included in the first subband area are classified into a plurality of subband sets in advance, where one subband set includes at least one subband, and the sub-identifier information of the second subband in the first subband area includes an identifier of a subband set to which the second subband belongs and a sub-identifier of the second subband in the subband set.

Specifically, the measurement pilot signal is a downlink measurement pilot signal or an uplink measurement pilot signal.

Figure 8:
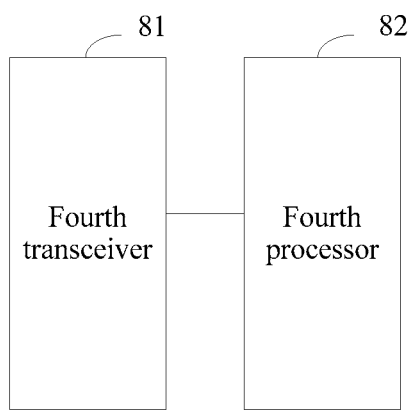
FIG. 8 is yet another schematic structural diagram of a device for transmitting a measurement pilot signal according to an embodiment of this application.

Same as the foregoing concept, as shown in FIG. 8, this embodiment of this application further provides a device for transmitting a measurement pilot signal, including:

a fourth transceiver 81, configured to receive identifier information of a first subband area sent by a first device and receive a measurement pilot signal on a determined physical resource block, where the first subband area includes at least one subband, and one subband includes at least one physical resource block; and a fourth processor 82, configured to determine, based on the identifier information of the first subband area, the physical resource block that is used to transmit the measurement pilot signal.

Specifically, when determining, based on the identifier information of the first subband area, the physical resource block that is used to transmit the measurement pilot signal, the fourth processor is specifically configured to determine, based on the identifier information of the first subband area and according to a preset rule, the physical resource block that is used to transmit the measurement pilot signal.

Specifically, the fourth transceiver is further configured to receive sub-identifier information, sent by the first device, of a second subband in the first subband area, where the second subband is used to transmit the measurement pilot signal; and when determining, based on the identifier information of the first subband area, the physical resource block that is used to transmit the measurement pilot signal, the fourth processor is specifically configured to determine, based on the identifier of the first subband area and the sub-identifier of the second subband, the physical resource block that is used to transmit the measurement pilot signal.

Specifically, the system bandwidth includes X subband areas, the identifier information of the first subband area includes X bits of data, and an arrangement order of the X bits of data is corresponding to an arrangement order of the X subband areas, where a data bit corresponding to the first subband area is set to a first identifier, and a data bit corresponding to each subband area in the X subband areas except the first subband area is set to a second identifier, where the first identifier represents a subband area that is used to transmit the measurement pilot signal, the second identifier represents a subband area that is not used to transmit the measurement pilot signal, and X is a natural number; or a plurality of subband areas included in the system bandwidth are classified into a plurality of subband area sets in advance, where one subband area set includes at least one subband area, and the identifier information of the first subband area includes an identifier of a subband area set to which the first subband area belongs and a sub-identifier of the first subband area in the subband area set; or when the measurement pilot signal is transmitted using a plurality of consecutive subband areas, the identifier information of the first subband area is generated based on an identifier of a start subband area in the plurality of consecutive subband areas and a quantity of the consecutive subband areas; or the system bandwidth includes X subband areas, the first subband area is the $Y^{th}$ subband area in the X subband areas, and the identifier information of the first subband area is a binary number corresponding to Y, where Y is a natural number.

Specifically, the first subband area includes W subbands, the sub-identifier information of the second subband in the first subband area includes W bits of data, and an arrangement order of the W bits of data is corresponding to an arrangement order of the W subbands, where a data bit corresponding to the second subband is set to a first identifier, and a data bit corresponding to each subband in the W subbands except the second subband is set to a second identifier, where the first identifier represents a subband that is used to transmit the measurement pilot signal, the second identifier represents a subband that is not used to transmit the measurement pilot signal, and W is a natural number; or when the measurement pilot signal is transmitted using a plurality of consecutive second subbands, the sub-identifier information of the second subband in the first subband area is generated based on an identifier of a start subband in the plurality of consecutive subband areas and a quantity of the consecutive subband areas; or the first subband area includes W subbands, the second subband is the $P^{th}$ subband in the W subbands, and the sub-identifier information of the second subband in the first subband area is a binary number corresponding to P, where P is a natural number; or a plurality of subbands included in the first subband area are classified into a plurality of subband sets in advance, where one subband set includes at least one subband, and the sub-identifier information of the second subband in the first subband area includes an identifier of a subband set to which the second subband belongs and a sub-identifier of the second subband in the subband set.

Specifically, the measurement pilot signal is a downlink measurement pilot signal or an uplink measurement pilot signal.

It can be learned from the foregoing descriptions that, in this embodiment of this application, first, the first device divides the entire system bandwidth into different subbands, and each subband occupies at least one PRB. Then, from the entire system, the first device determines the first subband that is used to transmit the measurement pilot signal, and sends the identifier information of the first subband to the second device. Finally, the first device embeds the measurement pilot signal in the PRB corresponding to the first subband, and transmits the PRB embedded with the measurement pilot signal to the second device. Correspondingly, the second device may demodulate the measurement pilot signal from a plurality of received PRBs based on the identifier of the first subband. It can be learned that, with the method disclosed in this embodiment of this application, a measurement pilot signal can be transmitted on partial bandwidth.

A person skilled in the art should understand that the embodiments of this application may be provided as a method, a system, or a computer program product. Therefore, this application may take a form of hardware only embodiments, software only embodiments, or embodiments with a combination of software and hardware. Moreover, this application may use a form of a computer program product that is implemented on one or more computer-usable storage media (including but not limited to a magnetic disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing devices to generate a machine, so that the instructions executed by a computer or a processor of any other programmable data processing devices generate a device for implementing a specific function in one or more processes in the flowcharts and/or in one or more blocks in the block diagrams.

These computer program instructions may alternatively be stored in a computer readable memory that can instruct the computer or any other programmable data processing device to work in a specific manner, so that the instructions stored in the computer readable memory generate an artifact that includes an instruction device. The instruction device implements a specific function in one or more processes in the flowcharts and/or in one or more blocks in the block diagrams.

These computer program instructions may be loaded onto a computer or other programmable data processing devices, so that a series of operations and steps are performed on the computer or the other programmable devices, thereby generating computer-implemented processing. Therefore, the instructions executed on the computer or the other programmable devices provide steps for implementing a specific function in one or more processes in the flowcharts and/or in one or more blocks in the block diagrams.

Obviously, a person skilled in the art can make various modifications and variations to the embodiments of this application without departing from the spirit and scope of the embodiments of the present invention. This application is intended to cover these modifications and variations provided that they fall within the scope of protection defined by the following claims and their equivalent technologies.

What is claimed is:

1. A method comprising:
   determining, by a first device from a plurality of subbands comprised in system bandwidth, a first subband set, wherein the first subband set comprises a plurality of consecutive subbands, a quantity of physical resource blocks (PRBs) comprised in a subband of the plurality of consecutive subbands is an integral multiple of a quantity of PRBs comprised in a PRB bundle and the PRB bundle is used for joint channel estimation by a second device;
   sending, by the first device, identifier information of the first subband to the second device; and
   transmitting, by the first device, a measurement pilot signal in the PRBs corresponding to the first subband set to the second device.

2. The method according to claim 1, wherein
   the identifier information of the first subband set is generated based on identifier information of a start subband in the plurality of consecutive subbands and a quantity of the consecutive subbands.

3. The method according to claim 1, wherein the first device is a base station, the second device is user equipment, and the measurement pilot signal is a downlink measurement pilot signal.

4. The method according to claim 1, wherein the first device is user equipment, the second device is a base station, and the measurement pilot signal is an uplink measurement pilot signal.

5. A method comprising:
   receiving, by a second device, identifier information of a first subband set from a first device, wherein the first subband set comprises a plurality of consecutive subbands, a quantity of physical resource blocks (PRBs) comprised in a subband of the plurality of consecutive subbands is an integral multiple of a quantity of PRBs comprised in a PRB bundle, and the PRB bundle is used for joint channel estimation by the second device;
   determining, by the second device based on the identifier information of the first subband set, PRBs corresponding to the first subband set; and
   receiving, by the second device on the determined PRBs, a measurement pilot signal from the first device.

6. The method according to claim 5, wherein
   the identifier information of the first subband set is generated based on identifier information of a start subband in the plurality of consecutive subbands and a quantity of the consecutive subbands.

7. The method according to claim 5, wherein the first device is a base station, the second device is user equipment, and the measurement pilot signal is a downlink measurement pilot signal.

8. The method according to claim 5, wherein the first device is user equipment, the second device is a base station, and the measurement pilot signal is an uplink measurement pilot signal.

9. An apparatus comprising:
   a transceiver, configured to receive identifier information of a first subband set from a first device, wherein the first subband set comprises a plurality of consecutive subbands, a quantity of physical resource blocks (PRBs) comprised in a subband of the plurality of consecutive subbands is an integral multiple of a quantity of PRBs comprised in a PRB bundle, and the PRB bundle is used for joint channel estimation by the second device; and
   at least one processor, configured to determine the second device based on the identifier information of the first subband set, PRBs corresponding to the first subband set,
   wherein the transceiver is further configured to receive, on the determined PRBs, a measurement pilot signal from the first device.

10. The apparatus according to claim 9, wherein the identifier information of the first subband set is generated based on identifier information of a start subband in the plurality of consecutive subbands and a quantity of the consecutive subbands.

11. The apparatus according to claim 9, wherein the first device is a base station, the second device is user equipment, and the measurement pilot signal is a downlink measurement pilot signal.

12. The apparatus according to claim 9, wherein the first device is user equipment, the second device is a base station, and the measurement pilot signal is an uplink measurement pilot signal.

\* \* \* \* \*